(12) United States Patent
Bhagwat et al.

(10) Patent No.: US 11,947,938 B2
(45) Date of Patent: Apr. 2, 2024

(54) APPLICATION DEVELOPMENT PLATFORM

(71) Applicant: BMC Software, Inc., Houston, TX (US)

(72) Inventors: Anand Bhaskar Bhagwat, Pune (IN); Ashutosh Abhay Deshpande, Pune (IN)

(73) Assignee: BMC Software, Inc., Houston, TX (US)

( * ) Notice: Subject to any disclaimer, the term of this patent is extended or adjusted under 35 U.S.C. 154(b) by 107 days.

(21) Appl. No.: 17/650,759

(22) Filed: Feb. 11, 2022

(65) Prior Publication Data

US 2023/0259337 A1 Aug. 17, 2023

(51) Int. Cl.
| | | |
|---|---|---|
| *G06F 16/2457* | (2019.01) | |
| *G06F 8/33* | (2018.01) | |
| *G06F 8/38* | (2018.01) | |
| *G06F 16/2453* | (2019.01) | |
| *G06F 16/2455* | (2019.01) | |

(Continued)

(52) U.S. Cl.
CPC ............... *G06F 8/38* (2013.01); *G06F 8/33* (2013.01); *G06F 16/211* (2019.01); *G06F 16/217* (2019.01); *G06F 16/22* (2019.01); *G06F 16/2228* (2019.01); *G06F 16/245* (2019.01); *G06F 16/2453* (2019.01);

(Continued)

(58) Field of Classification Search
CPC . G06F 8/38; G06F 8/33; G06F 16/217; G06F 16/22; G06F 16/2228; G06F 16/24542; G06F 16/211; G06F 16/2453; G06F 16/245; G06F 16/284; G06F 16/3338; G06F 16/24549

See application file for complete search history.

(56) References Cited

U.S. PATENT DOCUMENTS 7,092,936 B1 * 8/2006 Alonso ............... G06F 16/3338
707/999.005
10,762,085 B2 * 9/2020 Tariq .................. G06F 16/24544

(Continued)

OTHER PUBLICATIONS

Tsukasa Kudo et al., An Application of MongoDB to Enterprises System Manipulating Enormous Data, 2017, [Retrieved on Nov. 1, 2023]. Retrieved from the internet: <URL: http://www.infsoc.org/journal/vol09/IJIS_09_3_097-108.pdf> 8 Pages (97-108) (Year: 2017).*

(Continued)

*Primary Examiner* — Anibal Rivera
(74) *Attorney, Agent, or Firm* — Brake Hughes Bellermann LLP

(57) ABSTRACT

Systems and techniques for identifying performance issues and recommending actions during design-time application development include receiving a design-time user interface (UI) having multiple fields associated with data from a database, where the multiple fields including one or more types of fields. In response to receiving a trigger, the systems and techniques iterate through the multiple fields in the design-time UI by applying one or more rules related to the types of fields and cardinality of the data from the database. One or more recommendations are generated for one or more of the fields based on the applied rules to the multiple fields and the recommendations are output to a display. The systems and techniques may include changing the design-time UI without user input using the recommendations.

21 Claims, 11 Drawing Sheets

(51) Int. Cl.
  *G06F 16/21* (2019.01)
  *G06F 16/22* (2019.01)
  *G06F 16/245* (2019.01)
  *G06F 16/28* (2019.01)
  *G06F 16/33* (2019.01)

(52) U.S. Cl.
  CPC .. *G06F 16/24542* (2019.01); *G06F 16/24549* (2019.01); *G06F 16/284* (2019.01); *G06F 16/3338* (2019.01)

(56) References Cited

U.S. PATENT DOCUMENTS

| | | | | |
|---|---|---|---|---|
| 2003/0093408 | A1* | 5/2003 | Brown | G06F 16/2272 |
| 2005/0125427 | A1* | 6/2005 | Dageville | G06F 16/217 |
| 2007/0136386 | A1* | 6/2007 | Burger | G06F 16/2272 |
| 2008/0178079 | A1* | 7/2008 | Chen | G06F 16/217 |
| | | | | 715/700 |
| 2017/0091276 | A1* | 3/2017 | Hawton | G06F 16/24549 |
| 2018/0096006 | A1* | 4/2018 | Das | G06F 16/221 |
| 2021/0382911 | A1* | 12/2021 | Nelson | G06F 16/93 |
| 2022/0269684 | A1* | 8/2022 | Brendle | G06F 16/24552 |

OTHER PUBLICATIONS

S. Bobrowski: "Know Thy Salesforce Field Indexes for Fast Reports, List Views, and SOQL," Salesforce Developer's Blog, available at <https://developer.salesforce.com/blogs/engineering/2015/06/know-thy-salesforce-field-indexes-fast-reports-list-views-soql>, Jun. 16, 2015, 6 pages.

Servicenow: "Quebec Now Platform Administration," available online at <https://docs.servicenow.com/bundle/quebec-platform-administration/page/administer/platform-performance/concept/index-suggestions.html>, Jan. 31, 2022, 9 pages.

* cited by examiner

Order

Lunch time | Order

Field included in this regular record o New Field ∨ | Delete | Copy

202 | 204

| ☐ Field Name | Fiel.↑ | Data type | Required | Default value |
|---|---|---|---|---|
| ☐ Status | 7 | Selection | Yes | Submitted |
| ☐ Description | 8 | Text | Yes(System) | Not listening |
| ☐ Notifier listening | 16 | Selection | Yes(System) | |
| ☐ ID | 379 | Text | No | |
| ☐ Delivery | 536870913 | Date/Time | No | |
| ☐ Special Instructions | 536870914 | Text | Yes | |
| ☐ Requested date | 536870915 | Date | Yes | 10.00.00 |
| ☐ Cutoff Time | 536870916 | Time | No | |
| ☐ Fulfilling restaurant_ID | 536870917 | Text | No | |
| ☐ Dish ordered_ID | 536870918 | Text | Yes | |
| ☐ Contact person | 536870919 | Text | | |

0 of 17 selected

{}JSON | Save | Close

Details

Environment field

Keywords field

INDEXES

14509_0_379_T4509 (Automatic) Unique. 1 field

14509_0_8_T4509 Not unique, 1 Field

14509_0_02_T4509 Not unique, 2 Field

14509_0_536870919_T45 Not unique, 1 Field

○ Add Index

DISPLAY VALUE

Associated display field

500

502

| ← Telco - OneDrive × | ◇ [telco-july-alpha... × | ⓐ Views – lunch time. × | ⓐ Orders-lunch.. × | ⓐ Orders-view.... × | + |
|---|

← → C  ⚠ Not secure | punsdfkdhfdsjkfhsdf979879ds8f7dsfdskfhdsfkhs98987

⚏ Apps ☐ Imported from IE  O Chapter 6.Aspect O OpenAjax Acces.. ☐ Accessible Rich.. ☐ WebSphere Network  » | ☐ Other bookm..| ☐ Reading..

ⓐbmc Index Lunch time | New order | Orders | Restaurants

Signed as Demo user for startup

All lunch orders...

| ⟲ ⊤ Filter | | | 0 of 12 selected | Search | Q | ↓ Visible column | |
|---|---|---|---|---|---|---|---|
| Requested date | Status | Description | Dish | Restaurant | Delivery | Contact person name | |
| ○ Aug 12, 2021 | Submitted | Send off for so..... | Hakka noode. | Chinese rest.. | | Ashutosh desh.. | |
| ○ Aug 11, 2021 | Submitted | Birthday cele... | Pizza | Italian res... | | | |
| ○ Aug 10, 2021 | In progress | Birthday cele... | Strawberry.. | Monginie | | | |
| ○ Aug 4, 2021 | Submitted | Lunch | Hakka noode. | Chinese rest.. | | | |
| ○ June 16, 2021 | In progress | Working lunch... | Pizza | Italian rest.. | | | |
| ○ June 2, 2021 | Closed | Permotion cele... | Biryani | Indian rest.. | Jun 1, 2021, 9.. | | |
| ○ June 1, 2021 | Delivered | Birthday cele... | Chocklate... | Monginie | | | |
| ○ June 1, 2021 | Delivered | Send off for a... | Veg pasta | Italian rest.. | Jun 1, 2021, 9.. | | |
| ○ June 1, 2021 | Closed | Send off for a | Fried rice | Chinese rest.. | Jun 1, 2021, 9.. | | |

| ⟲ ⊤ Filter | | |
|---|---|---|
| Name | Search | Q |
| | Primary phone number | |

No items available

| View | Record Definition | Field | Recommendation | Feedback | Actions |
|---|---|---|---|---|---|
| Order List | Order | | Provide page size | Missing page size | Auto-fix |
| Order List | Order | Requested Date | SI | Index present | Auto-fix |
| Order List | Order | Requested Date | Set as default sort field | Default sort present | Auto-fix |
| Order List | Order | ID | SI | Index present | Auto-fix |
| Order List | Order | ID | Set as default sort field | Default sort present | Auto-fix |
| Order List | Order | Status | CI (ID, Status) | DB index missing | Auto-fix |
| Order List | Order | Status | CI (Requested Date, Status) | DB index missing | Auto-fix |
| Order List | Order | Status | Don't allow sort | Sort not present | Auto-fix |
| Order List | Order | Description | FTS | FTS index missing | Auto-fix |
| Order List | Order | Description | Don't allow sort | Remove sorting on the field | Auto-fix |
| Order List | Order | Dish Name | CI (ID, Dish Name) | Use database composite index | Auto-fix |
| Order List | Order | Dish Name | CI (Requested Date, Dish Name) | Use database composite index | Auto-fix |
| Order List | Order | Dish Name | Don't allow sort | Remove sorting on the field | Auto-fix |
| Order List | Order | Restaurant Name | CI (ID, Restaurant Name) | Index present | Auto-fix |
| Order List | Order | Restaurant Name | CI (Requested Date, Restaurant Name) | Index present | Auto-fix |
| Order List | Order | Restaurant Name | Don't allow sort | Sort not present | Auto-fix |
| Order List | Order | Delivery Date | SI | DB index missing | Auto-fix |
| Order List | Order | Delivery Date | Set as default sort field | Default sort present | Auto-fix |
| Order List | Order | Contact Person | FTS | FTS index missing | Auto-fix |
| Order List | Order | Contact Person | Don't allow sort | Sort not present | Auto-fix |

FIG. 10

APPLICATION DEVELOPMENT PLATFORM

TECHNICAL FIELD

This description relates to an application development platform.

BACKGROUND

An application development platform refers to a tool or a collection of tools that allows developers to design, develop, and deploy applications. An application development platform may provide enterprise class, end-to-end software development and testing for applications using visual creation and user interfaces. An application development platform may support the development of different types of applications including, for example, web applications, mobile applications, enterprise applications, as well as other types of applications. An application development platform may be a code-based and/or a codeless (or no-code) development platform.

A codeless or no-code development platform is one that allows both programmers and non-programmers to create application software using graphical user interfaces (GUIs) and configurations instead of using traditional coded programming. Generally, codeless application development platforms require no code writing at all to allow even non-technical users to develop software without composing a line of code by using GUIs, templates, and drag-and-drop capabilities. As just one example, in a codeless application development platform, a developer can create an entity form with multiple, different types of fields including text fields, number fields, date/time fields, and other types of fields for an end-user to fill out in the application such that the information entered in the fields is recorded in a searchable database. As another example, in a codeless application development platform, the developer can create different views using entities with components that allow configuring which fields may be queried, filtered, and/or sorted while searching for the information recorded in a searchable database. A developer may be defined to include both technical and non-technical users as well as non-humans such as, for instance, an artificial intelligence (AI) system.

In some application development situations, application performance problems occur when the application is deployed into a production or runtime environment, where the production environment is the setting where the application is put into operation for use by end-users. For example, many applications developed with search capabilities encounter performance issues in the production or runtime environment. For instance, in the context of an application that enables a search capability, problems may arise due to slow running queries. The slow running queries may occur because appropriate indices were not defined during the application development stage. When the developer is creating and adding features to an application during the development process, the developer may not appreciate or be able to understand the runtime performance implications related to the created or added features. In an effort to make a "feature rich" application, the developer may unknowingly introduce performance issues when the application is deployed in the production environment.

SUMMARY

According to one general aspect, the systems and techniques described herein for identifying performance issues and recommending actions during design-time application development include receiving a design-time user interface (UI) having multiple fields associated with data from a database, where the multiple fields include one or more types of fields. In response to receiving a trigger, the systems and techniques described herein iterate through the multiple fields in the design-time UI by applying one or more rules related to the types of fields and cardinality of the data from the database. One or more recommendations are generated for one or more of the fields based on the applied rules to the multiple fields, and the recommendations are output to a display.

Implementations may include one or more of the following features. For example, in some implementations, the systems and techniques may include changing the design-time UI without developer or other user input using the generated recommendations.

In some implementations, the systems and techniques described herein may further include generating random data based on the types of fields from the database, iterating through the multiple implementations in the changed design-time UI by applying the one or more rules related to the types of fields and cardinality of the random data, generating one or more updated recommendations for one or more of the fields based on the applied rules to the multiple fields and outputting the updated recommendations to the display.

In some implementations, the systems and techniques described herein may further include changing the changed design-time UI without developer or other user input using the updated recommendations.

In some implementations, the recommendations may include a field name, a description of a performance issue, and an action.

In some implementations, the recommendations may include creating a single index for a field with data values having a high cardinality.

In some implementations, the recommendations may include creating a full text search index for a field with data values having an amount of text exceeding a threshold.

In some implementations, the recommendations may include creating a composite index pairing for a field having a low cardinality.

In some implementations, the systems and techniques described herein may have the trigger be an input that saves the design-time user interface.

The systems and techniques described herein may be implemented as part of a computer system, a computer-implemented method, and/or a computer program product. The details of one or more implementations are set forth in the accompanying drawings and the description below. Other features will be apparent from the description and drawings, and from the claims.

BRIEF DESCRIPTION OF THE DRAWINGS

FIG. 2 is an example screenshot from the example application development platform used by a developer.

FIG. 5 is an example screenshot of the application created by the developers as viewed in runtime in a production environment as displayed to an end-user.

FIG. 6 is an example screenshot of the application created by the developers as viewed in runtime in a production environment as displayed to an end-user.

FIG. 10 is a table with an example recommendation report. The report is an example referring to the order list view.

DETAILED DESCRIPTION

The systems and techniques described herein provide technical solutions to the technical problems encountered as part of the application development process. As described above, performance issues may arise when the application is deployed in a production or runtime environment. For instance, in the context of an application that enables a search capability, problems may arise due to slow running queries. The slow running queries may occur because appropriate indices were not defined during the application development stage. Other problems may arise in the production environment that cause the application to perform processes slowly such that performance of the application and the end-user experience is degraded. Instead of addressing the performance issues reactively after the issue is identified in the production environment, the systems and techniques described in this document proactively identify potential performance issues at design-time in the application development platform before the application is deployed into a production environment. The systems and techniques described herein provide a technical solution to identify potential application performance issues by providing visual indications and/or warnings of performance issues and providing visual recommendations and actions for automatically (or manually) correcting or fixing the visually indicated issues.

Figure 1:
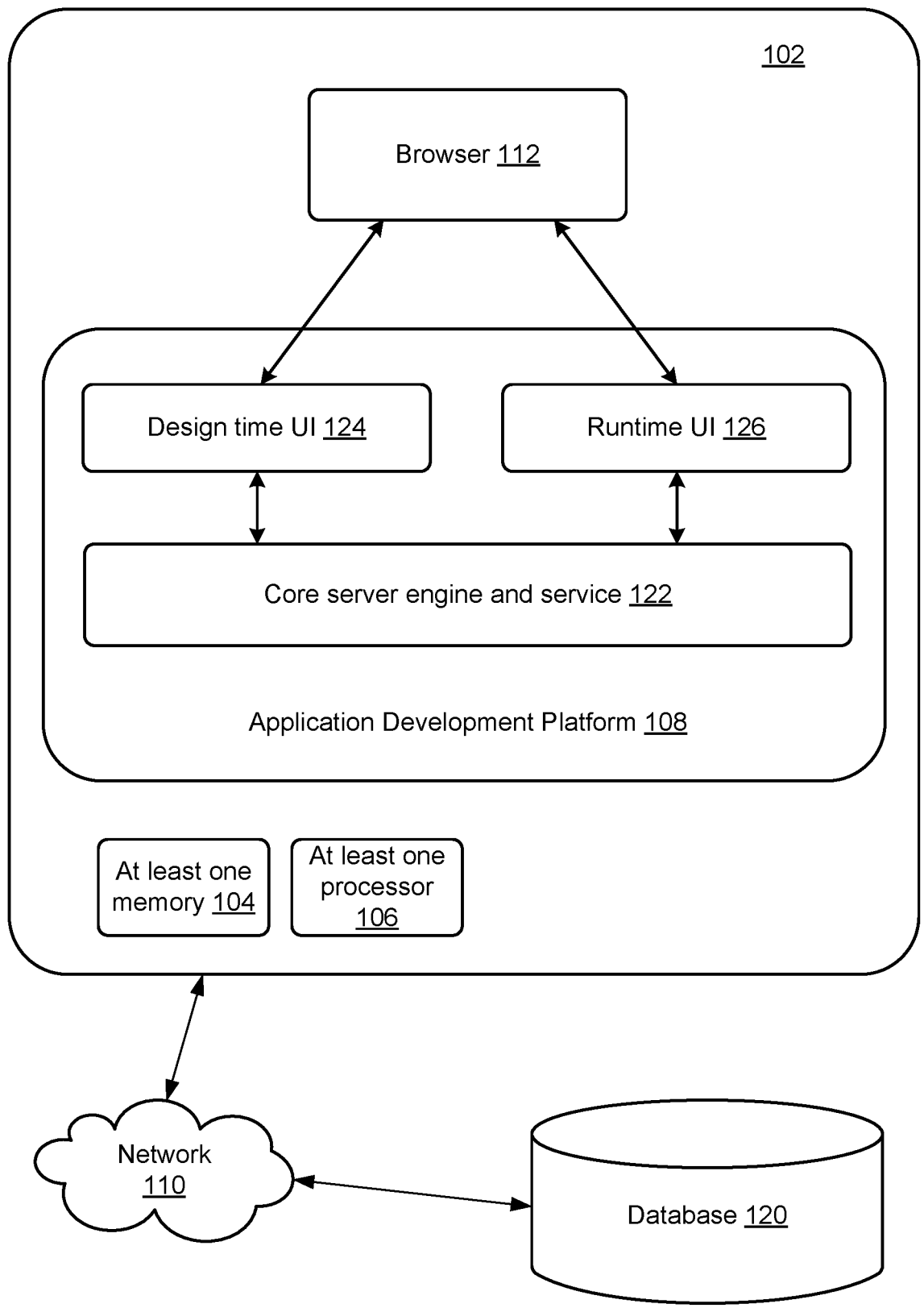
FIG. 1 is an example block diagram of an application development platform.

FIG. 1 is an example block diagram of a system 100 for developing, designing, testing, and implementing applications. The system 100 includes a computing device 102, a network 110, and a database 120. The computing device 102 includes at least one memory 104, at least one processor 106, and an application development platform 108. The computing device 102 may communicate with one or more other computing devices over the network 110. For instance, the computing device 102 may communicate with the database 120 over the network 110. The computing device 102 may be implemented as a server (e.g., an application server), a desktop computer, a laptop computer, a mobile device such as a tablet device or mobile phone device, a mainframe, as well as other types of computing devices. Although a single computing device 102 is illustrated, the computing device 102 may be representative of multiple computing devices in communication with one another, such as multiple servers in communication with one another being utilized to perform various functions over a network. In some implementations, the computing device 102 may be representative of multiple virtual machines in communication with one another in a virtual server environment, including those in a cloud environment or on a mainframe. In some implementations, the computing device 102 may be representative of one or more mainframe computing devices.

The at least one processor 106 may represent two or more processors on the computing device 102 executing in parallel and utilizing corresponding instructions stored using the at least one memory 104. The at least one processor 106 may include at least one graphics processing unit (GPU) and/or central processing unit (CPU). The at least one memory 104 represents a non-transitory computer-readable storage medium. Of course, similarly, the at least one memory 104 may represent one or more different types of memory utilized by the computing device 102. In addition to storing instructions, which allow the at least one processor 106 to implement the application development platform 108 and its various components, the at least one memory 104 may be used to store data, such as rules, views, user interfaces (UI), and information used by and/or generated by the application development platform 108 and the components used by application development platform 108.

The network 110 may be implemented as the Internet but may assume other different configurations. For example, the network 110 may include a wide area network (WAN), a local area network (LAN), a wireless network, an intranet, combinations of these networks, and other networks. Of course, although the network 110 is illustrated as a single network, the network 110 may be implemented as including multiple different networks.

The application development platform 108 (also referred interchangeably to as an innovation suite (IS) platform) may be accessed directly by a user of the computing device 102, for example, through a browser 112. One example implementation of an application development platform 108 is the BMC Helix® platform, specifically the BMC Helix Innovation Studio. In other implementations, the application development platform 108 may be running on the computing device 102 as a component of a cloud network, where the user accesses the application development platform 108 from another computing device over a network, such as the network 110. Examples of applications developed using the BMC Helix Innovation Studio include, but are not limited to, BMC Business Workflows, BMC Multi-Cloud Service Management, and BMC ITSM Insights.

The database 120 includes data that may be any type of data as organized in the database. In some implementations, the database 120 may be implemented on the computing device 102 instead of on a separate computing device. The database 120 may include multiple fields of varying field types, where the fields include data values. For example, a field may include a set of data values of the same data type, in a table, which also may be referred to as a column or an attribute. Example field types include, but are not limited to, text, alphanumeric, character, string, byte, integer, counter, datetime, time stamp, date, time, binary, and Boolean, as well as other field types.

Cardinality of the data in the database 120 refers to the number of distinct values in a field (or table column) relative to the number of rows in the table. Cardinality (also referred to as data cardinality) impacts on which fields to index. High cardinality refers to data values in a field with a lot of distinct values. Low cardinality refers to data values in a field with a lot of repeated or duplicate values. A threshold value related to a number of distinct values in a field may be used to determine a high cardinality versus a low cardinality.

The application development platform 108 includes a core server engine and service 122. The core server engine and service 122 enables an application developer or other user to use a design-time user interface (UI) 124 for designing coded and/or codeless applications using drag drop capabilities of the platform using the browser 112. In some implementations, the developer creates an entity known as a record definition using the design-time UI 124. The developer creates a view with a grid that can display lists of entities, where searching and filtering of entity records is enabled. The developer can define database indexes or full text search (FTS) indexes for better search performance. The underlying data used by the core server engine and service 122, for which the design-time UI is developed, is stored in the database 120. That is, the developer uses the application development platform 108 to design an application that enables the user to display and manipulate data from the database 120.

Based on the above developed application, a runtime UI 126 (or runtime view) is rendered with a grid that displays a list of records from the underlying data in the database 120 to the user. In the runtime UI 124, which may be accessed by the user using the browser 112, the user can perform various functions on the data using the application including without limit querying, sorting, filtering, modifying, graphing, displaying, and inputting data. Manipulation of the data may result in additional searches with different criteria and sort capability. Depending on user input, searches may be fast or slow depending on the adequateness of database and FTS indexes. The core server engine and service 122 may be used to identify potential performance issues that may occur during use by the user of the runtime UI 126, but the identification of the issues, recommendations to fix the issues, and automatic implementation of the recommendations occur in the design-time UI 124.

FIG. 2 is an example screenshot 200 from the example application development platform 108 used by the developer. The screenshot 200 is an example for defining an entity (e.g., order record definition) in the design-time UI 124. Defining an entity in the design-time UI 124 includes columns such as field name 202 and data type 204 (or field type). The data types 204 (or field types) may include types such as text, enumerations (dropdown, radio button), numeric, date time, attachment, etc. that can be used for creating the entity.

Figure 3:
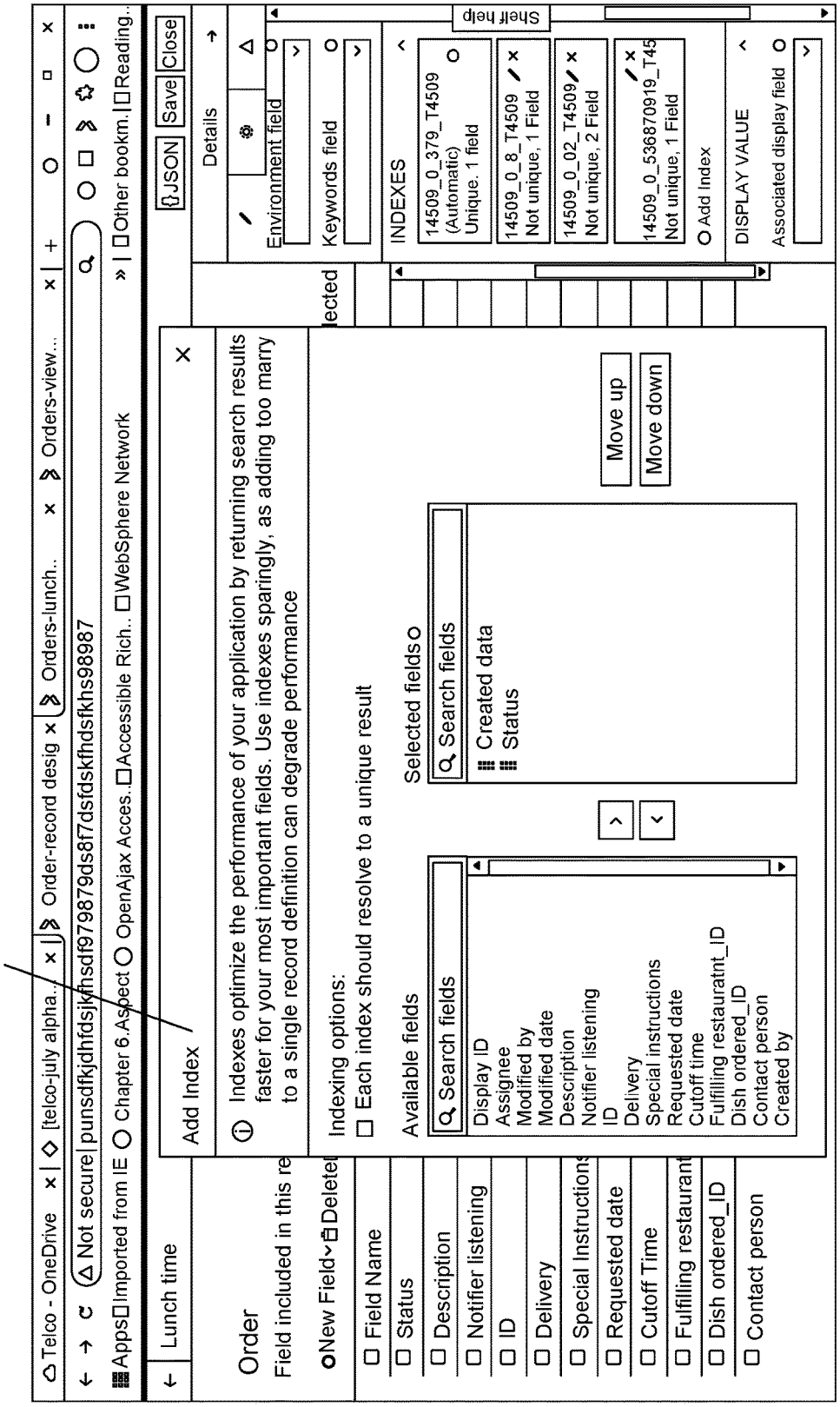
FIG. 3 is an example screenshot from the example application development platform used by a developer.

FIG. 3 is an example screenshot 300 from the example application development platform 108 used by the developer. The screenshot 300 is an example for creating a database index 302 for performance in the design-time UI 124. Depending on experience and expertise of the developers, the database may be created using database indices with single or multiple fields in hope of better runtime performance.

Figure 4:
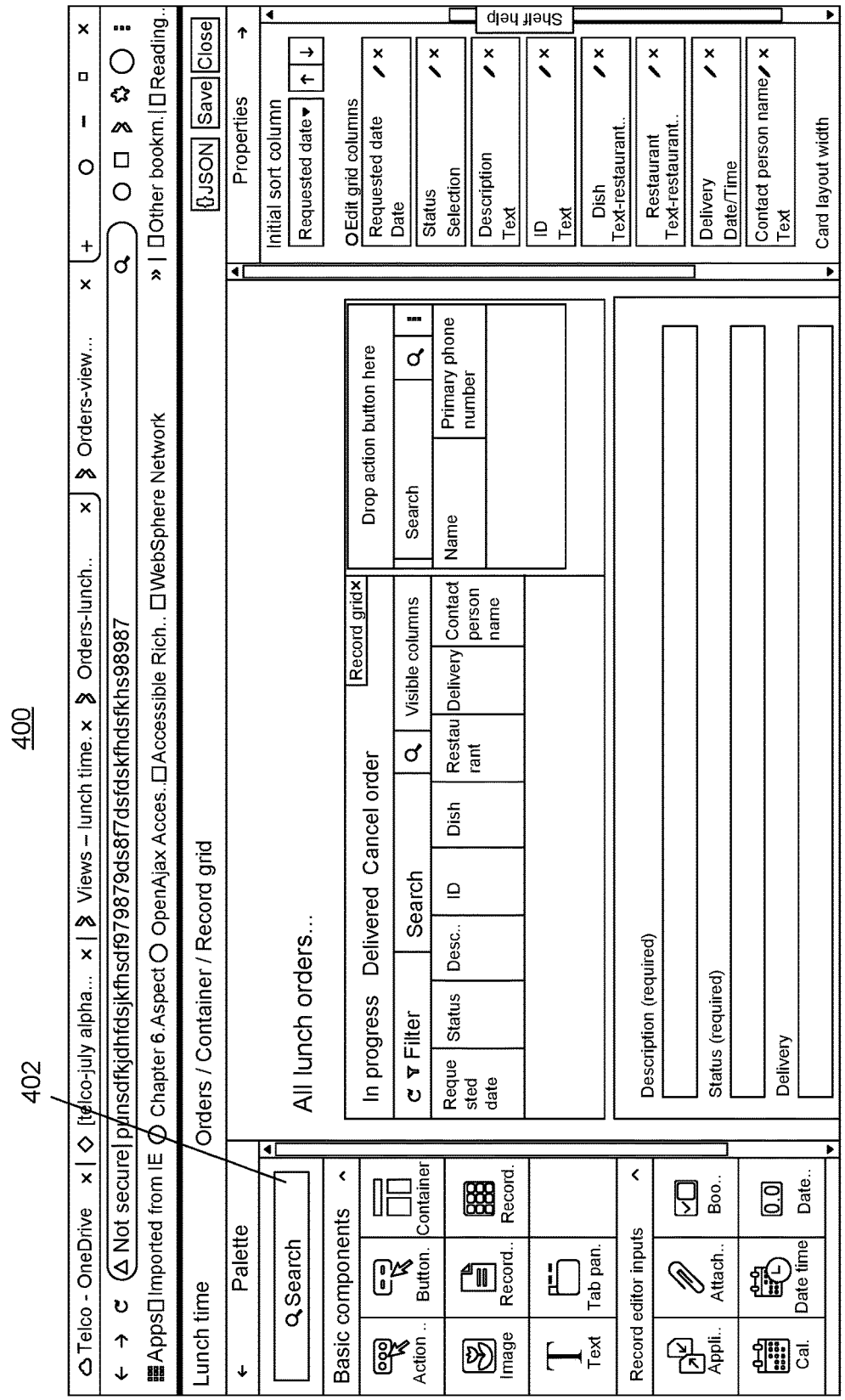
FIG. 4 is an example screenshot from the example application development platform used by a developer.

FIG. 4 is an example screenshot 400 from the example application development platform 108 used by the developer. This screenshot 400 is an example for creating a view for search 402 (e.g., an order record grid) in the design-time UI 124. A view for search 402 allows defining user interface (UI) on top of one or more entities. The example screenshot 400 shows a simple grid that will be used for searching orders and for filtering or sorting the list once it is put into the runtime UI 126.

FIG. 5 is an example screenshot 500 of the application created by the developers as viewed in the runtime UI 126 in a production environment as displayed to the end-user. Specifically, the screenshot 500 illustrates an example of search results 502 in a grid, which is referenced as order list view. The example screenshot 500 provides how the end-user sees the actual data at runtime in the runtime UI 126 based on the codeless view design that was put together by the developer in the design-time UI 124 using the application development platform 108.

Figure 6:
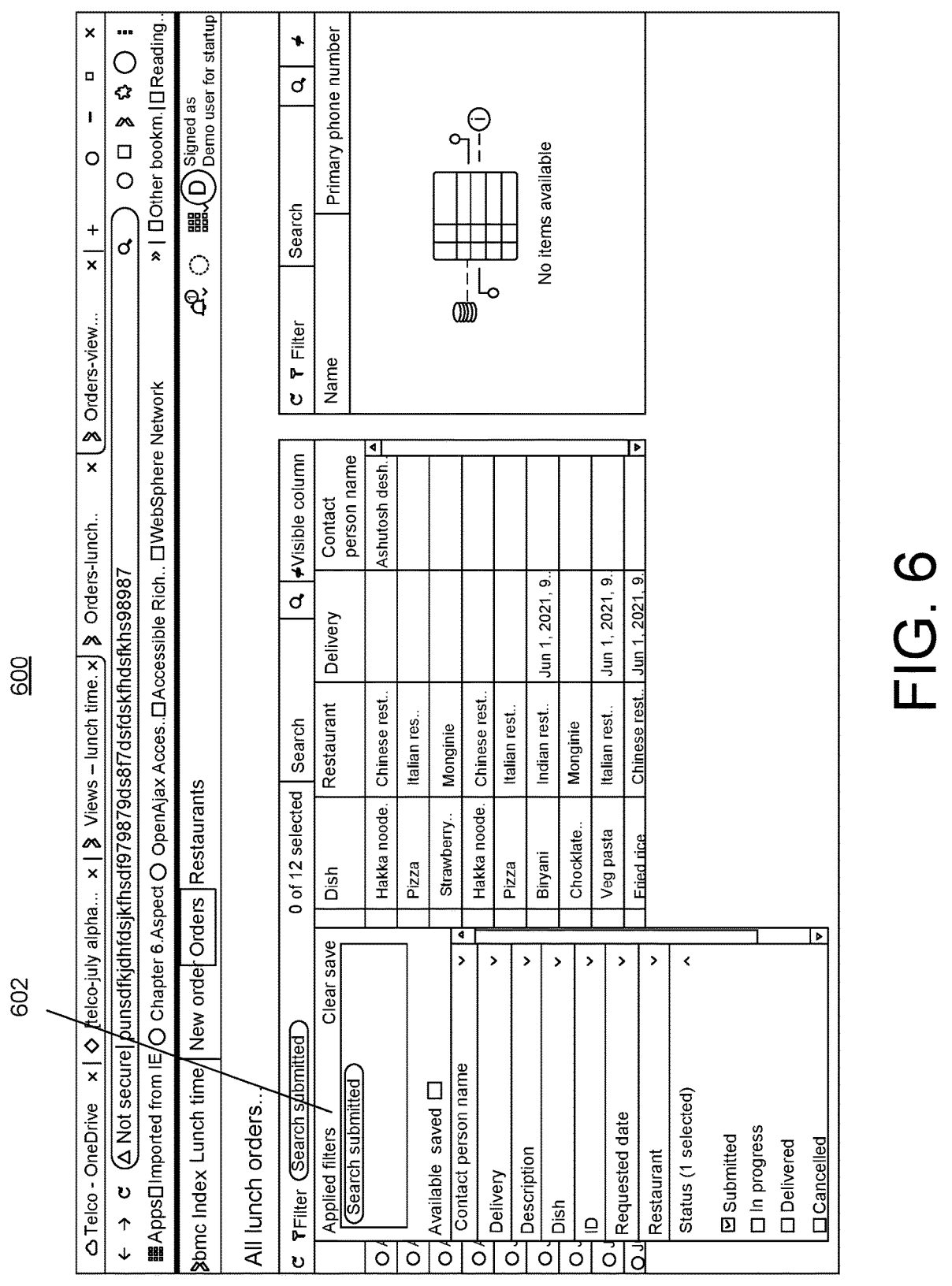

FIG. 6 is an example screenshot 600 of the application created by the developer as viewed in the runtime UI 126 in a production environment as displayed to the end-user. Specifically, the screenshot 600 illustrates an example of filtering search results 602 based on a field value. For instance, the end-user has options to perform additional filtering or sorting on the list resulting in different searches.

The technical solution to solve the technical problems identified above includes providing a design-time recommendation when the developer is creating entities and views that involve searches. The systems and techniques described herein also provides a way to simulate search performance at design-time itself by allowing generation of sample data based on a unique algorithm that will consider fields and related metadata.

Figure 7:
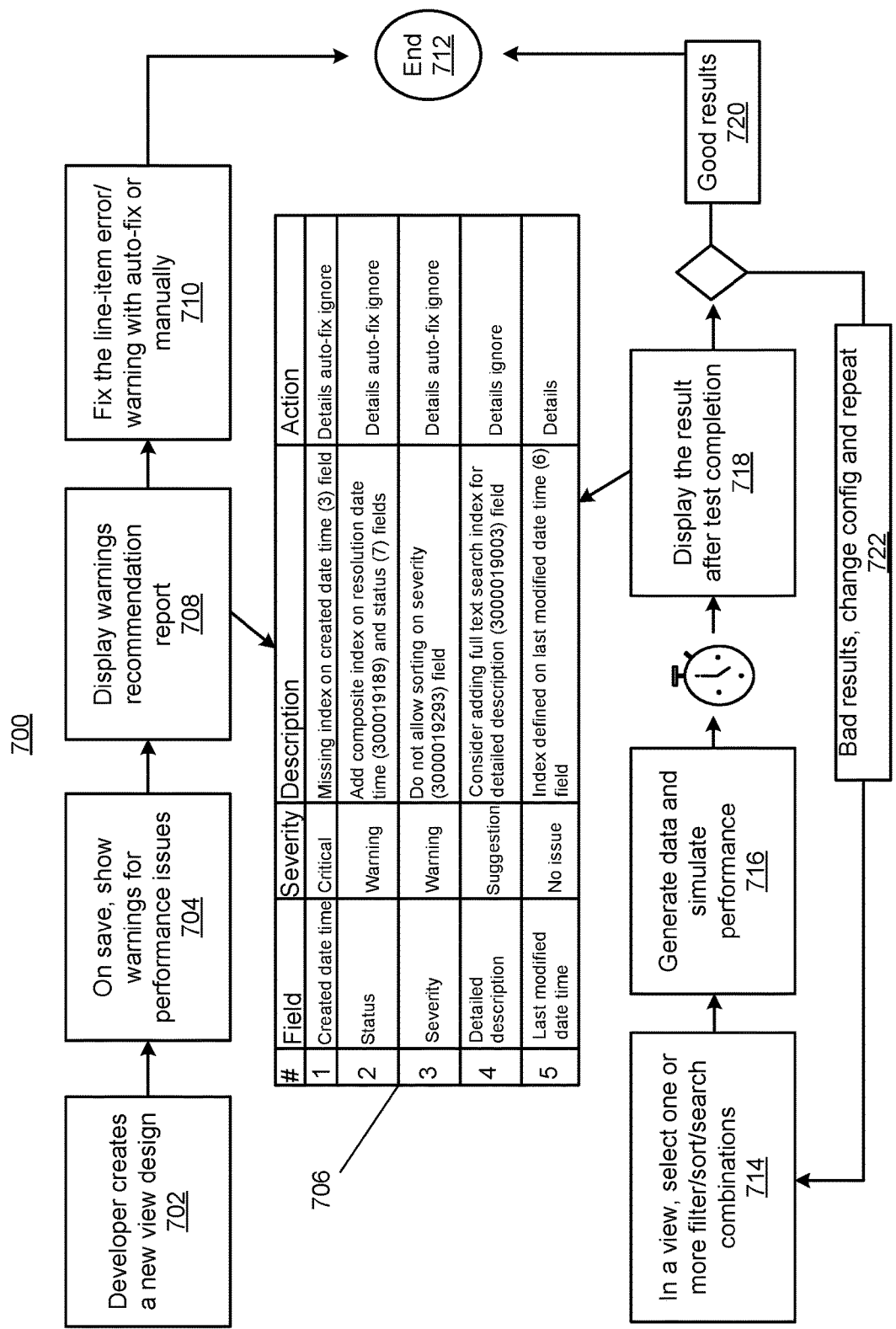
FIG. 7 is an example flowchart of a process for identifying potential performance issues during application development, generating a visual indication of the potential issue, and automatically correcting the potential issue.

FIG. 7 is an example flowchart of a process 700 for identifying potential performance issues during application development, generating a visual indication of the potential issue, and automatically correcting the potential issue. Further, the process 700 of FIG. 7 may generate data and simulate the performance of the application. The simulation generates and outputs visual results for the developer to evaluate the simulation.

Process 700 may be performed and implemented on the application development platform 108. More specifically, the process 700 may be performed by the core server engine and service 122 using the at least one memory 104 and the at least one processor 106. Process 700 includes the developer creating a new view design 702. For example, the example screenshots 200, 300, and 400 are examples of the developer creating a new view design using the design-time UI 124 of the application development platform 108. The core server engine and service 122 receives the design-time UI having multiple fields associated with data from the database 120, where the fields include one or more types of fields.

Process 700 includes showing warnings for performance issues 704 when the view created using the design-time UI 124 is saved 704. More specifically, when the core server engine and service 122 receives a trigger, the core server engine and service 122 iterates through the fields in the design-time UI 124 by applying one or more rules related to the types of fields and cardinality of the data from the database 120. In some implementations, the trigger that causes the core server engine and service 122 to perform this process is the saving of the view in the design-time UI 124. Upon save, the process step 704 is performed. In some implementations, other triggers may cause the core server engine and service 122 to perform the process step 704. When the trigger is received, the core server engine and service 122 generates warnings for performance issues.

FIG. 7 illustrates example recommendations report 706 that may be displayed in the design-time UI 124. The recommendations report 706 includes a list of potential performance issues. The recommendations report 706 includes the field, a severity level of the issue, a description of the issue, and an action.

Process 700 includes clicking on (or selection of) warnings to cause a display of the recommendation report (708). Process 700 includes being able to fix the line-item error/warning either by auto-fixing the warning or manually fixing the warning (710). The recommendations report 706 includes actions that enable the identified performance issue to be fixed in multiple different ways by the core server engine and service 122. In some implementations, the design-time UI 124 may be changed, the recommendations may be implemented, and the performance issues may be auto-fixed or automatically corrected without user input. In some implementations, the design-time UI 124 may be changed, the recommendations may be implemented, and the performance issues may be corrected in response to a manual input received from the user. Process 700 may end 712 at this point. Of course, the user may save the changed design and the core server engine and service 122 may perform steps 704, 708, and 710 again.

Additionally, in the design-time UI 124 view, one or more filter/sort and/or search combinations may be selected (714). Data is generated, and performance is simulated (716). When the action is selected, the core server engine and service 122 generates random data from the database based on the types of fields. The core server engine and service 122 iterates through the fields of the design-time UI 124 by applying the rules related to the types of fields and the cardinality of the random data. The rules also account for the filter, sort, and/or search combinations selected. The core server engine and service 122 generates one or more updated recommendations for one or more fields based on the rules applied to the fields, and an updated recommendations report is output for display. That is, the results are displayed after test completion (718). If the results are "good results" (720) meaning that they are acceptable in accordance with any threshold or requirement, then the simulation may end (712). If the results are "bad results" (722) meaning that they are not acceptable because they violate or exceed a threshold or requirement, then further changes may be made and the steps of 714, 716, and 718 repeated.

Figure 8:
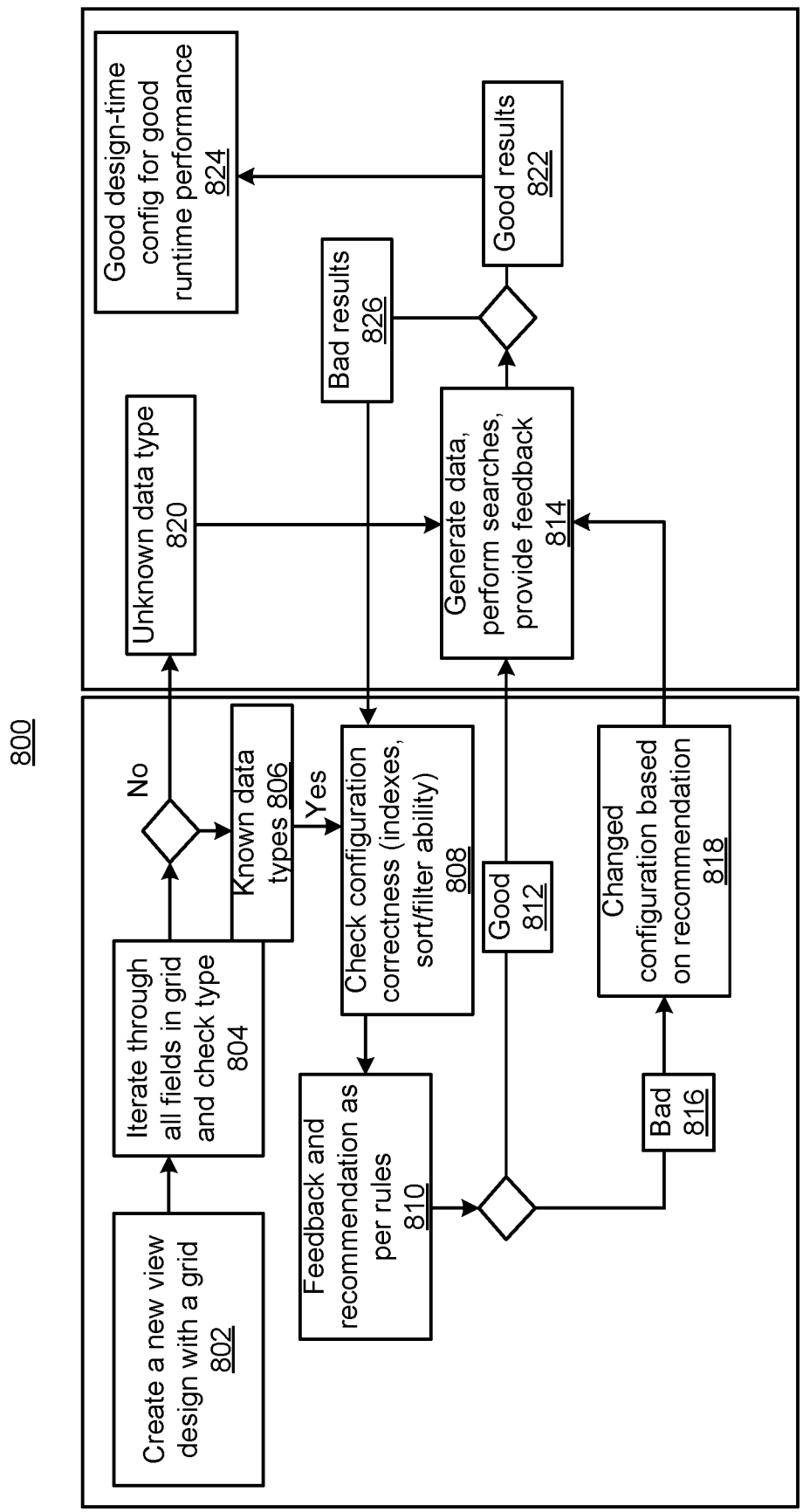
FIG. 8 is an example flowchart of a process for providing a design-time recommendation to a developer and for simulating search performance at design-time.

FIG. 8 is an example flowchart of a process 800 for providing a design-time recommendation and for simulating search performance at design-time. Process 800 may be performed and implemented on the application development platform 108. More specifically, the process 800 may be performed by the core server engine and service 122 using the at least one memory 104 and the at least one processor 106.

More specifically, create a new view design with a grid (802). In response to a trigger, such as saving the new view design, process 800 iterates through all fields in the grid and checks the type of fields (804). For known data types (806), the process 800 checks the configuration correctness (e.g., indexes, sort/filter ability, etc.) (808). Process 800 applies the rules and provides feedback and recommendation as per rules (810). That is, the core server engine and service 122 checks the sort and filter settings for each field in the grid and shows immediate warnings to indicate performance issues depending on data type and defined indexes. Warnings are displayed in a detailed report. Each line item will show a recommendation and an action (e.g., details, auto-fix, ignore, etc.). The core server engine and service 122 may be configured to auto-fix the identified problem based on the recommendation. If the feedback and recommendations are good (812) meaning that no warning are generated in the feedback and recommendations, then the next phase of checking the design in the design-time UI 124 may be performed by generating data (e.g., random data), performing searches, and providing feedback (814). If the feedback and recommendations are bad (816) meaning that warnings are generated in the feedback and recommendations, then configuration changes based on the recommendation may be made (818). FIG. 10 discussed below provides an illustration of a report with recommendations and feedback. The changes may be made automatically without user input or may be done manually with user input.

If the data type is unknown (820), then the next phase of checking the design in the design-time UI 124 may be performed by generating data (e.g., random data), performing searches, and providing feedback (814). If the results are "good" (822) meaning that no warning are generated in the feedback, then the design-time configuration is considered good for runtime performance in the runtime UI 126 (824). If the results are "bad" (826) meaning that warnings are generated in the feedback, then process 800 checks the configuration correctness (e.g., indexes, sort/filter ability, etc.) (808). FIG. 10 discussed below provides an illustration of a report with recommendations and feedback.

Figure 9:
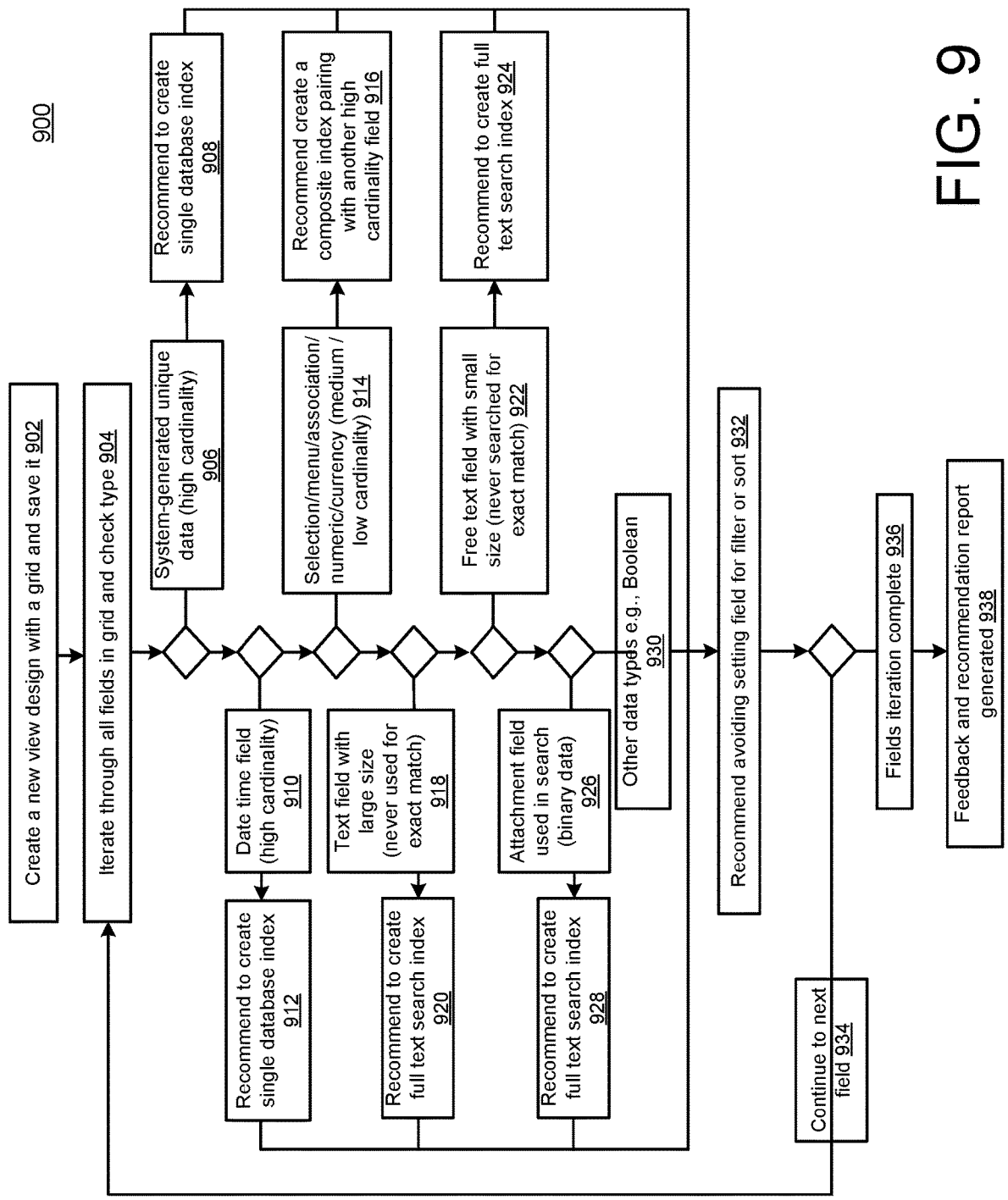
FIG. 9 is an example flowchart of a process for providing a design-time recommendation to a developer.

FIG. 9 is an example flowchart of a process 900 for providing a design-time recommendation. The recommendation report may be based on field types and database cardinality. As discussed above, the cardinality refers to the uniqueness of data values contained in a particular column of a database table. The lower the cardinality, the more duplicated elements in a column. Process 900 may be performed and implemented on the application development platform 108. More specifically, the process 900 may be performed by the core server engine and service 122 using the at least one memory 104 and the at least one processor 106.

In process 900, the a new view design with a grid is created and the new view design is saved (902). Process 900 iterates through all fields in the grid and checks the types of fields (904), processing one field at a time. During the iterations, the following rules may be applied to the different field types based on their cardinality of the data in the database 120.

This set of rules may be applied to generate the design-time recommendations. Fields with system-generated unique data (e.g., natural key, globally unique identifier (GUID), etc.) having a high cardinality (906), the rules recommend creating a single index (908). For date or time fields with high cardinality (910), the rules recommend creating a single database index (912). For selection/menu/association/numeric/currency fields (limited set of values e.g., status, priority, numbers, etc.) having medium/low cardinality (914), the rules recommend creating a composite index pairing with another high cardinality field (916). For text fields with a large size (918) (never used for exact match, so database index does not help), the rules recommend creating a full text search (FTS) index (920). That is, the rules may recommend creating a full text search index for a field with data values having an amount of text exceeding a threshold or requirement. For a free text field (i.e., without menu or association) with small size (never used for exact match, so database index does not help) (922), the rules recommend creating a full text search index (924). For an attachment field (binary data—database cannot search its contents) used in search (926), the rules recommend creating a full text search index (928). For all other field types (e.g., Boolean—low cardinality) (930), the rules recommend avoiding setting field for filter or sort (932).

Process 900 continues to the next field (934) and iterates through the next field by applying the rules based on the field type. When the fields iteration is complete (936), the feedback and recommendation report is generated (938).

A single database index is a database index on a single column. The rules recommend using a single database index when cardinality is detected as high. A composite database index is a database index on multiple columns. For example, a medium/low cardinality field may be combined with another high cardinality field. For instance, a create date field type of high cardinality may be combined with a status field type of medium/low cardinality. In another example, a create date field type of high cardinality may be combined with a status field type and a priority field type, both of which have medium/low cardinality. In yet another example, a first name field type of medium cardinality may be combined with a last name field type of medium cardinality. Generally, a high cardinality field should be first in the composite database index.

A full text search (FTS) index may be used for a field that is part of an inverted index based on text. In some implementations, the FTS index may be implemented with Apache Lucene or ElasticSearch index technologies.

FIG. 10 illustrates a table with an example recommendation report 1000. The recommendation report 1000 may include a view column, a record definition column, a field column, a recommendation column, a feedback column, and an actions column. The example recommendation report 1000 is an example referring to the order list view. The recommendations in the report may be automatically implemented such that the auto-fix will create missing indexes as per the recommendation.

Figure 11:
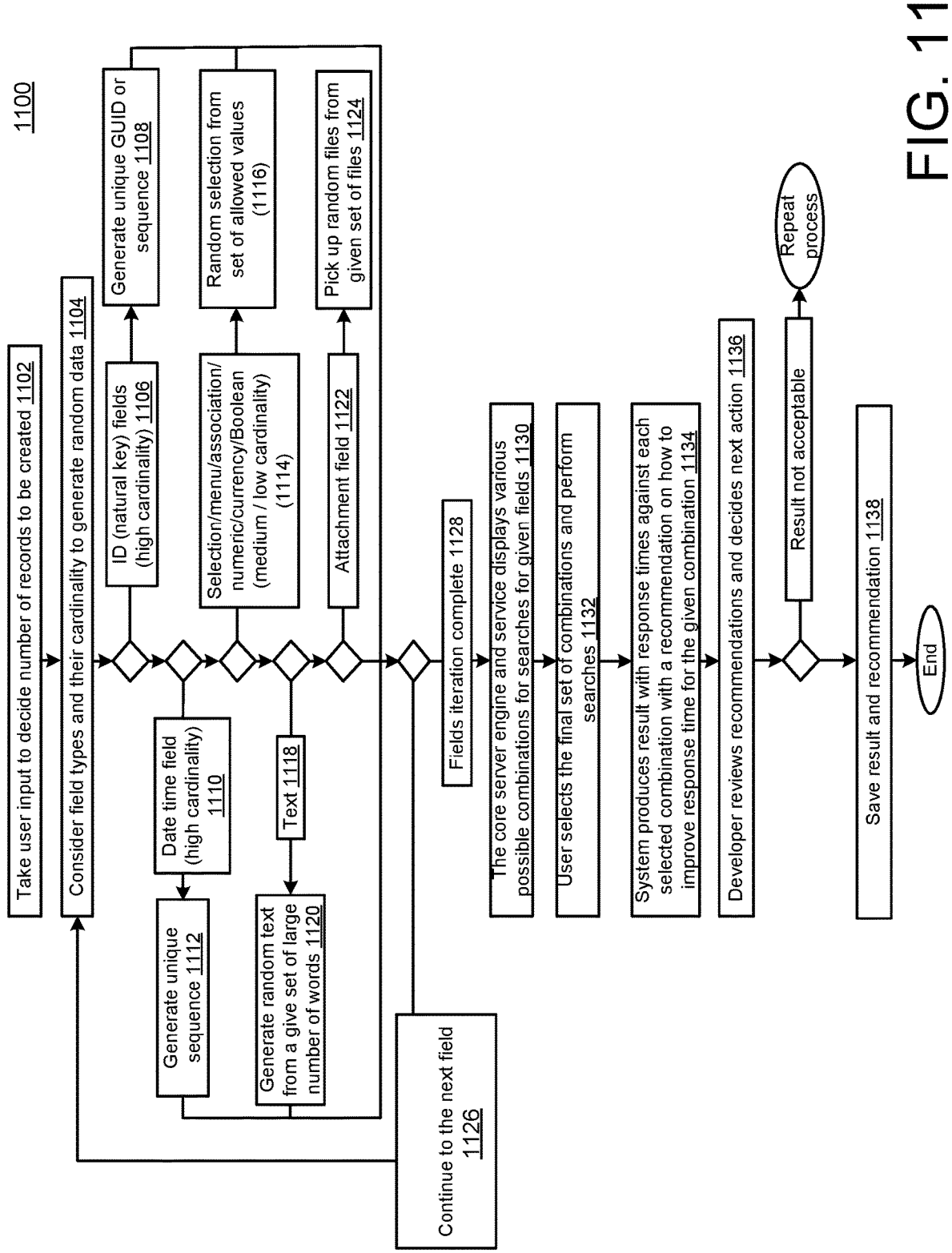
FIG. 11 is an example flowchart for data generation and feedback that results from performing a simulation of the application.

FIG. 11 is an example flowchart of a process 1100 for data generation and feedback that results from performing a simulation of the application. Process 1100 may be performed and implemented on the application development platform 108. More specifically, the process 1100 may be performed by the core server engine and service 122 using the at least one memory 104 and the at least one processor 106.

Process 1100 includes taking user input to decide a number of records to be created (1102). Process 1100 then considers the field types and their cardinality to generate random data (1104). Process 1100 performs the consideration of field types and cardinality by iterating over each field and applying one or more rules based on the field type and cardinality. For example, for ID (natural key) fields having a high cardinality (1106), the rules recommend generating a unique graphical user identifier (GUID) or sequence (1108). For example, for date time fields having a high cardinality (1110), the rules recommend generating a unique sequence (1112). For selection/menu/association/numeric/currency/Boolean fields having a medium/low cardinality (1114), the rules recommend selecting a random value from a set of allowed values (1116). The process allows the user to override randomly generated data distribution e.g., for status field, for example, the user may decide to consider that a 90% value is "Closed". For text fields (1118), the rules generate random text from a give set of large number of words (1120). For an attachment field (1122), the rules pick up random files from a given set of files (1124).

The process 1100 then continues to the next field (1126) and again iterates through the set of rules and applies the appropriate rule to the field type. When the field iteration is complete (1128), the core server engine and service 122 displays various possible combinations for searches for given fields (1130). The final set of combinations are selected, and the searches are performed by the core server engine and service 122 (1132).

The core server engine and service 122 produces a result with response times against each selected combination with the recommendation on how to improve response time for the given combination (1134). The developer reviews the recommendations and decides the next action, e.g., to fix indexes or remove filter/sort properties from the field or accept the result (1136).

The developer can repetitively perform process 900 and process 1100 from the solution until satisfied. Once the developer is satisfied, they can choose to save the current results and recommendations (1138) as a permanent record for future reference. There can be more than one version for the results for the developer to publish.

In this manner, the systems and techniques promote design-time thinking for performance at the outset that is missing such that it will reduce overall effort and hence burden the system in terms of cost related to performance defects seen during quality control audits, user acceptance testing, and during runtime in a production environment.

Implementations of the systems and techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with the user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with the user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which the user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for identifying performance issues and recommending actions during design-time application development, the computer-implemented method comprising:
   receiving a design-time user interface (UI) of an application that enables display and manipulation of data from a database, the design-time UI having a plurality of fields associated with the data from the database, the plurality of fields including one or more types of fields;
   responsive to receiving a trigger, iterating through the plurality of fields in the design-time UI by applying one or more rules related to the types of fields and cardinality of the data from the database;
   generating one or more recommendations for one or more of the fields of the design-time UI based on the applied rules to the plurality of fields;
   outputting the recommendations to a display;
   using the recommendations to change the design-time UI without user input;
   generating random data based on the types of fields from the database, the random data being different than the data from the database;
   iterating through the plurality of fields in the changed design-time UI by applying the one or more rules related to the types of fields and cardinality of the random data;
   generating one or more updated recommendations for one or more of the fields of the design-time UI based on the applied rules to the plurality of fields; and
   outputting the updated recommendations to the display.

2. The computer-implemented method as in claim 1, further comprising changing the changed design-time UI without user input using the updated recommendations.

3. The computer-implemented method as in claim 1, wherein the recommendations include a field name, a description of a performance issue, and an action.

4. The computer-implemented method as in claim 1, wherein the recommendations include creating a single index for a field with data values having a high cardinality.

5. The computer-implemented method as in claim 1, wherein the recommendations include creating a full text search index for a field with data values having an amount of text exceeding a threshold.

6. The computer-implemented method as in claim 1, wherein the recommendations include creating a composite index pairing for a field having a low cardinality.

7. The computer-implemented method as in claim 1, wherein the trigger is an input that saves the design-time user interface.

8. A computer program product for identifying performance issues and recommending actions during design-time application development, the computer program product being tangibly embodied on a non-transitory computer-readable medium and including executable code that, when executed, causes a data processing apparatus to:
   receive a design-time user interface (UI) of an application that enables display and manipulation of data from a database, the design-time UI having a plurality of fields associated with the data from the database, the plurality of fields including one or more types of fields;
   responsive to receiving a trigger, iterate through the plurality of fields in the design-time UI by applying one or more rules related to the types of fields and cardinality of the data from the database;
   generate one or more recommendations for one or more of the fields of the design-time UI based on the applied rules to the plurality of fields;
   output the recommendations to a display;
   use the recommendations to change the design-time UI without user input;
   generate random data based on the types of fields from the database, the random data being different than the data from the database;
   iterate through the plurality of fields in the changed design-time UI by applying the one or more rules related to the types of fields and cardinality of the random data;
   generate one or more updated recommendations for one or more of the fields of the design-time UI based on the applied rules to the plurality of fields; and
   output the updated recommendations to the display.

9. The computer program product of claim 8, further comprising executable code that, when executed, causes the data processing apparatus to change the changed design-time UI without user input using the updated recommendations.

10. The computer program product of claim 8, wherein the recommendations include a field name, a description of a performance issue, and an action.

11. The computer program product of claim 8, wherein the recommendations include creating a single index for a field with data values having a high cardinality.

12. The computer program product of claim 8, wherein the recommendations include creating a full text search index for a field with data values having an amount of text exceeding a threshold.

13. The computer program product of claim 8, wherein the recommendations include creating a composite index pairing for a field having a low cardinality.

14. The computer program product of claim 8, wherein the trigger is an input that saves the design-time user interface.

15. A system for identifying performance issues and recommending actions during design-time application development, the system comprising:
   at least one processor; and a non-transitory computer-readable medium comprising instructions that, when executed by the at least one processor, cause the system to:
  receive a design-time user interface (UI) of an application that enables display and manipulation of data from a database, the design-time UI having a plurality of fields associated with the data from the database, the plurality of fields including one or more types of fields;
  responsive to receiving a trigger, iterate through the plurality of fields in the design-time UI by applying one or more rules related to the types of fields and cardinality of the data from the database;
  generate one or more recommendations for one or more of the fields of the design-time UI based on the applied rules to the plurality of fields;
  output the recommendations to a display;
  use the recommendations to change the design-time UI without user input;
  generate random data based on the types of fields from the database, the random data being different than the data from the database;
  iterate through the plurality of fields in the changed design-time UI by applying the one or more rules related to the types of fields and cardinality of the random data;
  generate one or more updated recommendations for one or more of the fields of the design-time UI based on the applied rules to the plurality of fields; and
  output the updated recommendations to the display.

16. The system of claim 15, further comprising instructions that, when executed by the at least one processor, cause the system to change the changed design-time UI without user input using the updated recommendations.

17. The system of claim 15, wherein the recommendations include a field name, a description of a performance issue, and an action.

18. The system of claim 15, wherein the recommendations include creating a single index for a field with data values having a high cardinality.

19. The system of claim 15, wherein the recommendations include creating a full text search index for a field with data values having an amount of text exceeding a threshold.

20. The system of claim 15, wherein the recommendations include creating a composite index pairing for a field having a low cardinality.

21. The system of claim 15, wherein the trigger is an input that saves the design-time user interface.

* * * * *